(12) United States Patent
Delano et al.

(10) Patent No.: US 7,370,135 B2
(45) Date of Patent: May 6, 2008

(54) BAND CONFIGURATION AGENT FOR LINK BASED COMPUTING SYSTEM

(75) Inventors: Eric Delano, Fort Collins, CO (US);
Ioannis Schoinas, Portland, OR (US);
Akhilesh Kumar, Sunnyvale, CA (US);
Doddaballapur Narasimha-Murthy Jayasimha, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 11/284,520

(22) Filed: Nov. 21, 2005

(65) Prior Publication Data

US 2007/0118678 A1 May 24, 2007

(51) Int. Cl.
*G06F 13/00* (2006.01)

(52) U.S. Cl. .................. 710/316; 710/317; 710/10; 710/38

(58) Field of Classification Search ........ 710/305–317, 710/8–19, 240–244, 22–28, 38; 326/38–41; 714/30–31; 709/208–211
See application file for complete search history.

(56) References Cited

U.S. PATENT DOCUMENTS

| | | | |
|---|---|---|---|
| 5,394,556 A | 2/1995 | Oprescu | |
| 5,961,623 A | 10/1999 | James et al. | |
| 6,516,375 B1 | 2/2003 | Ajanovic et al. | |
| 6,526,462 B1 * | 2/2003 | Elabd | 710/242 |
| 6,874,039 B2 * | 3/2005 | Ganapathy et al. | 710/28 |
| 6,915,365 B2 | 7/2005 | Creta et al. | |
| 6,985,988 B1 * | 1/2006 | Nsame | 710/305 |
| 7,080,283 B1 * | 7/2006 | Songer et al. | 714/30 |
| 7,103,823 B2 | 9/2006 | Nemawarkar et al. | |
| 7,170,315 B2 * | 1/2007 | Bakker et al. | 326/38 |
| 7,210,000 B2 | 4/2007 | Creta et al. | |
| 2003/0158993 A1 | 8/2003 | Moy | |

(Continued)

FOREIGN PATENT DOCUMENTS

WO  WO 03048951  6/2003

OTHER PUBLICATIONS

Mayhew, D., et al., "PCI Express and Advanced Switching: Evolutionary Path To Building Next Generation Interconnects," High Performance Interconnects, 2003 Proceedings 11th Symposium on Aug. 20-22, 2003, pp. 21-29, XP010657970.

(Continued)

*Primary Examiner*—Raymond N Phan
(74) *Attorney, Agent, or Firm*—Blakely, Sokoloff, Taylor & Zafman LLP (57) ABSTRACT

A method is described that involves directing a configuration request through a switch core to a configuration agent. The method also involves processing the configuration request at the configuration agent. The method also involves sending a configuration command derived from the configuration request from the configuration agent to the switch core. The method also involves executing the configuration command at an agent to which the configuration command pertains.

20 Claims, 6 Drawing Sheets

U.S. PATENT DOCUMENTS

2004/0019704 A1* 1/2004 Sano et al. .................. 709/252
2005/0262391 A1 11/2005 Sethi et al.
2006/0165099 A1* 7/2006 Doherty et al. ............. 370/397

OTHER PUBLICATIONS

Gupta, P., et al., "Routing Lookups In Hardware At Memory Access Speeds," IEEE Computer and Communications Societies, Mar. 1998, pp. 1240-1247, ISBN: 0-7803-4383-2, XP010270370.

Shanley & Anderson: "PCI System Architecture, PC System Architecture Series," 1995, Addison Wesley, XP002343506, pp. 317-328, ISBN: 0-201-40993-3.

Leroys Engineering Web Site: "PCI Express Bus", Leroy Davis, Aug. 4, 2003, revision Available: http://web.archive.org/web/2003080584419/http:// www.interfacebus.com/Deisgn_Conector_PCI_Express.html.

* cited by examiner

| PROCESSING CORE OUTBOUND REQUEST | ADDRESS DECODER OVER-RIDE | ROUTING TABLE ENTRY=VALID | REQUEST | SYSTEM ACTION |
|---|---|---|---|---|
| | ACTIVE 701 | X 702 | FW ADDRESS | SWITCH ROUTE BASED ON ADDRESS 703 |
| | ACTIVE 704 | X 705 | FW ADDRESS 706 | SWITCH ROUTE TO NWK CNF AGENT 707 |
| 708 | INACTIVE | INACTIVE | X | REQUEST NOT ISSUED 709 |
| | INACTIVE | ACTIVE 710 | X | NORMAL OPERATION 711 |
| PROCESSING CORE INBOUND REQUEST | X | INACTIVE 712 | X | PERFORM REQUEST, DON'T SEND RESPONSE 713 |
| | X | ACTIVE | X | NORMAL OPERATION |

FIG. 7

BAND CONFIGURATION AGENT FOR LINK BASED COMPUTING SYSTEM

FIELD OF THE INVENTION

The field of invention relates generally to computing systems, and, more specifically, to band configuration agent for link based computing system.

BACKGROUND

Figure 1:
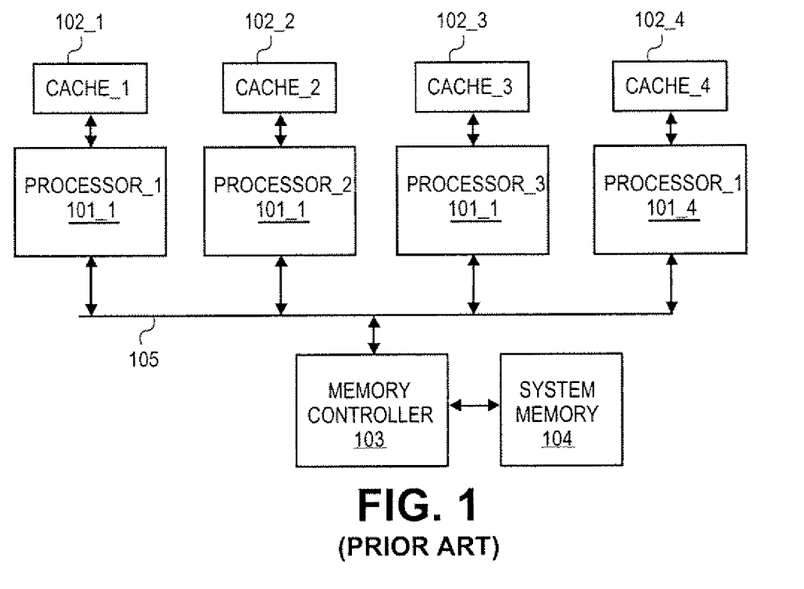
FIG. 1 shows a prior art multi-processor computing system having a front side bus.

Prior art multi-processor computing systems have typically used a "front side bus" between its one or more processors and its memory controller. FIG. 1 shows a traditional multi-processor prior art computing system. According to the depiction of FIG. 1, the front side bus 105 is a "shared medium" component in which electrical signals passed between any processor and any other processor and/or the memory controller 103 are carried over the same electrical wiring.

The front side bus 105 becomes a bottleneck, particularly for multi-processor systems, because there tends to be heavy communication over the front side bus 105 (through small communicative sessions called "transactions") between the processors 101_1 through 101_4 and the memory controller 103. In order to improve the performance of multi-processor systems, a new architecture has emerged (which may be referred to as "link based") in which the front side bus is replaced with a network having point-to-point links between the processors and memory controller.

Figure 2:
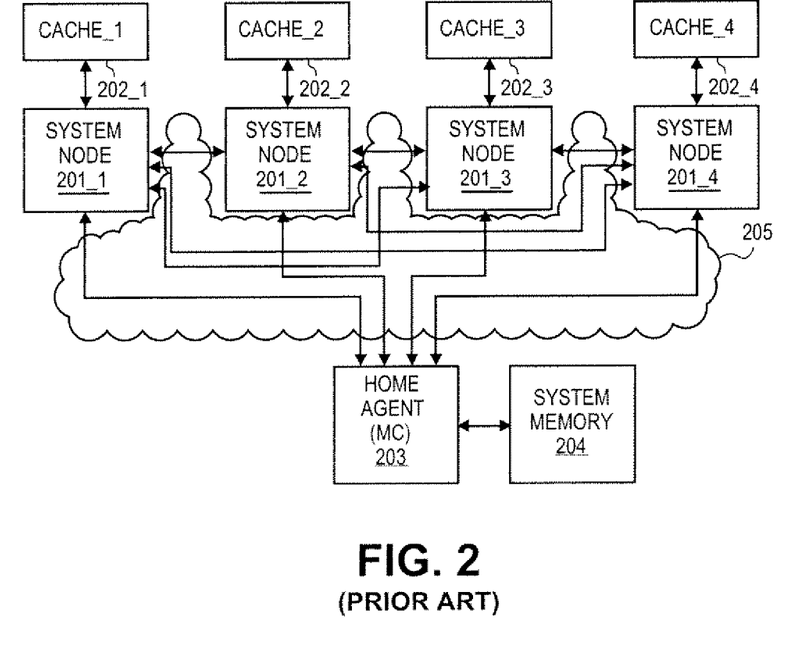
FIG. 2 shows a prior art multi-processor system having a network of point-to-point links in place of a front side bus.

FIG. 2 shows an example. Here, note that the system nodes 201_1 through 201_4 and memory controller 203 are communicatively coupled by a network 205 having point-to-point links between these components. For ease of drawing the point-to-point links are depicted as being bi-directional. Typically, however, these bi-directional point-to-point links are actually implemented with a pair of uni-directional point-to-point links directed in opposite directions with respect to one another. The links may be physically implemented as copper wiring with (e.g., coaxial) shielding and/or fiber optic links. According to the architecture of FIG. 2, a "system node" is a unit containing one or more processing cores (e.g., one or more units of logic circuitry that executes program code). A "system node" may also have associated cache 202_1 through 202_4 for its respective processing cores. A "home agent" 203 having a memory controller controls access to system memory 204. An "agent" is a component of a link based computing system that has its own network address so that it can receive packets from the network (and send packets into the network). According to this definition, system nodes 201_1 through 201_4 and home agent 203 each correspond to separate "agent" instances.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 3:
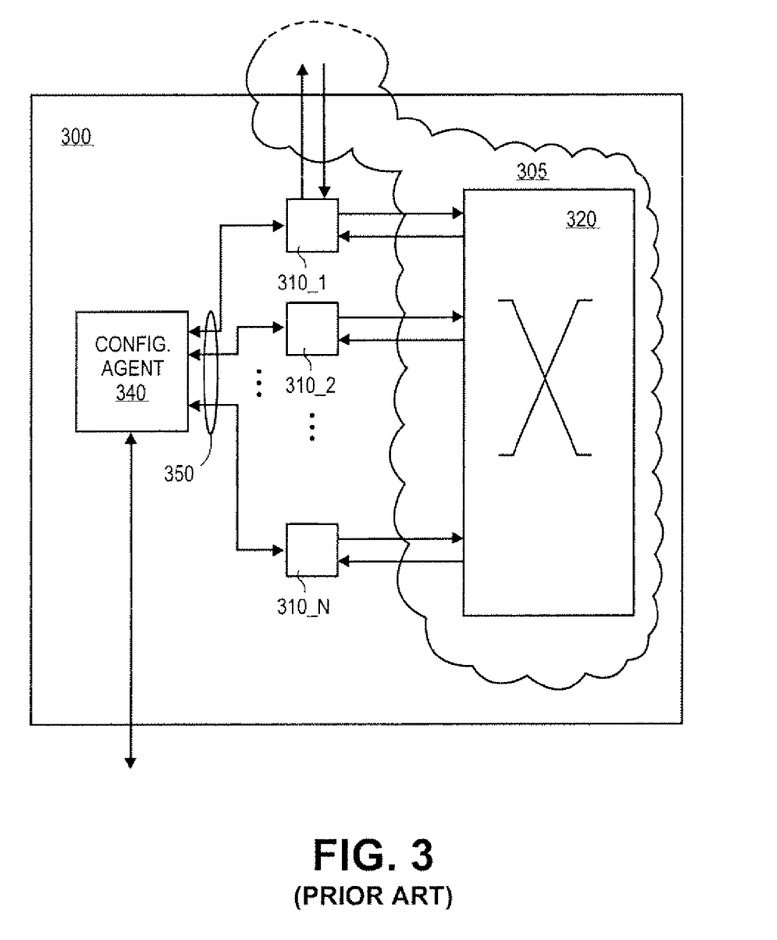
FIG. 3 shows a semiconductor chip designed to implement at least part of a link based computing system having an "out-of-band" configuration design.

FIG. 3 provides some implementation detail specifics (as opposed to the architectural depictions provided in FIGS. 1 and 2) of a semiconductor chip 300 having multiple computing system agents 310_1 through 310_N integrated thereon. To first order, the portion of the computing system's "network" 305 that is implemented on the chip 300 includes logic circuitry 320 designed to behave as a multi-port switch (e.g., a crossbar switch). This region of logic circuitry may be referred to as the semiconductor chip's "switch core".

Figure 4:
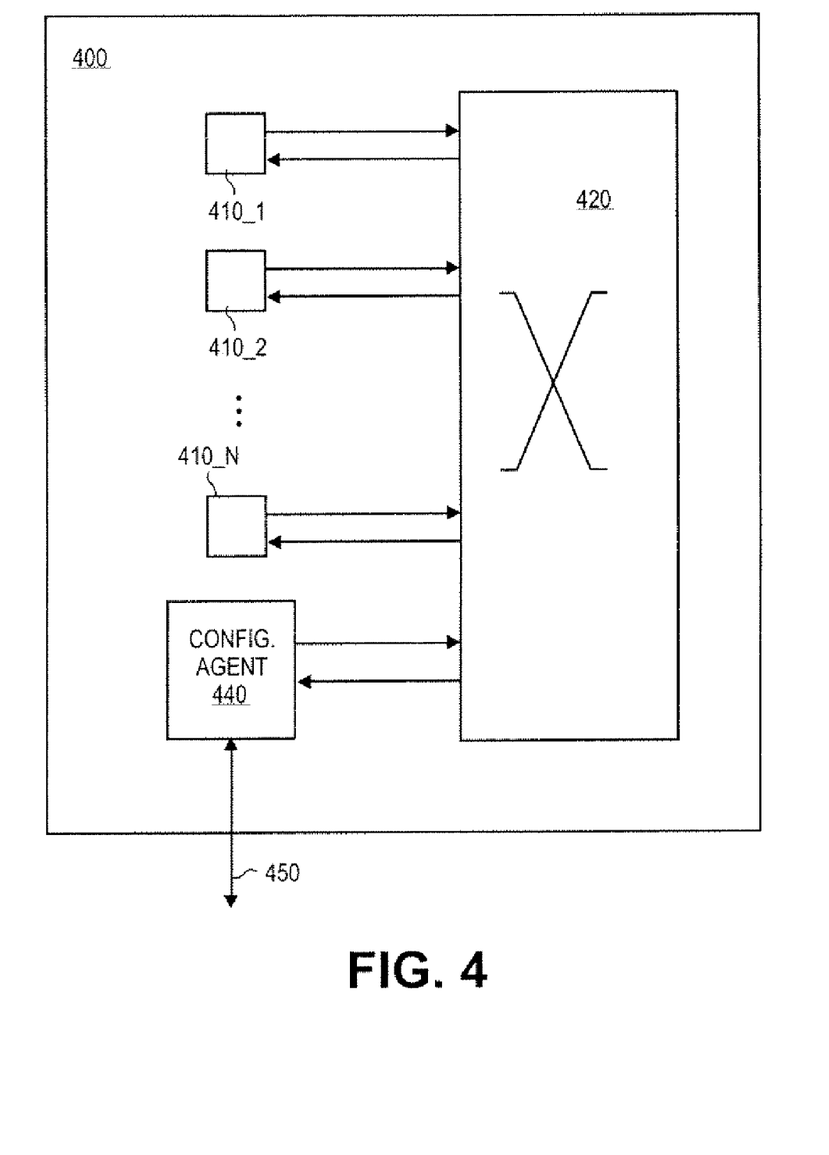
FIG. 4 shows an improved semiconductor chip designed to implement at least part of a link based computing system having an "in-band" configuration design.

The switch's input/output ports are coupled to various computing system agents 310_1 through 310_N. For instance, agents 310_1 through 310_N may correspond to a collection of system nodes with corresponding cache and/or home agents with corresponding system memory. Here, given that N such agents exist on the chip 300, conceivably, if N=5, the entire architecture observed in FIG. 2 could be designed onto the chip (e.g., agent 310_1 correspond to system node 201_1, agent 310_2 correspond to system node 201_2, agents 310_3 and 310_4 (not shown) correspond to system nodes 201_3 and 201_4 and their respective caches, and, agent 310_5=310_N corresponds to home agent 203). Note that the architecture of FIG. 4 is simplistic in that all agents are directly coupled to only a single switch core. Conceivably, the computing system network as implemented on the semiconductor chip may be designed to be more complex than that depicted in FIG. 4 (such as two switch cores communicatively coupled that each couple to different portions of the chip's agents).

A problem with the implementation of link based computing systems concerns the amount of hardware logic and associated wiring that is dedicated to the configuration of the system. The configuration of a system typically involves the writing of specific values into certain "configuration" registers and tables that are referred to by the computing system's hardware and/or software during operation. For simplicity, the term "configuration space" may be used to refer to a configuration register or a configuration table. Referring to FIG. 3, note the presence of configuration logic 340. The configuration logic 340 is responsible for writing/reading configuration information to/from the computing system's various instances of configuration space during its configuration (e.g., as part of its "bring-up" after a reset) or re-configuration.

Configuration space is apt to be found in any one of agents 310_1 through 310_N (and is especially likely to be found within an agent). As such, as depicted in FIG. 3, dedicated "out-of-band" wiring 350 between the configuration logic 340 and the agents 310_1 through 310_N has to be designed into the semiconductor chip 300. Here, "out-of band" can be construed to mean the signaling does not flow through the switch core 320. That is, when agents 310_1 through 310_N are configured, signals are sent over wiring 350 rather than through the switch 320. Unfortunately, the more complex the semiconductor chip's design, the more expensive the "out-of-band" wiring 350 becomes in terms of the semiconductor chip's surface layout, wiring and overall design complexity. The extra design burdens associated with the mere configuration of the chip can therefore, potentially, limit its scale (e.g., limit the size of N).

FIG. 4 shows an improved semiconductor chip 400 designed to implement at least part of a link based computing system having an "in-band" configuration design. According to the design of FIG. 4, the configuration logic circuitry 440 is essentially implemented as another system agent that uses the computing system's network. The configuration agent 440 is therefore coupled to the semiconductor chip's switch core 420 (e.g., by being attached to an input/output port of the switch core 420 as depicted in FIG. 4). In principal, at least with respect to its relationship with the computing system's network, the configuration agent 440 behaves similarly to the other agents within the link based computing system (e.g., the system nodes, the home agents, etc.) in that it has its own network address and can therefore receive packets from the network and send packets into the network.

According to the design strategy of FIG. 4, a configuration command issued by the configuration agent 440 (e.g., to write/read to/from the configuration space of one of the semiconductor chip's other agents 410_1 through 410_N) is packaged into a packet by the configuration agent 440. The packet's destination address identifies the agent having the configuration space to which the configuration command is directed. The packet is then sent by the configuration agent 440 into the switch core 420. The switch core 420 directs the packet toward the agent identified in the packet's destination address. The agent identified in the packet's destination address receives the packet and executes the configuration command. In this sense, because the configuration signaling is transported through the switch core 420 (by way of the packets described above), the configuration approach described above can be referred to as "in-band".

In the case of a "write" configuration command, the packet will often contain the data to be written and the identity of the specific configuration space into which the data is to be written. In this case, the agent that receives the packet will write the data into the configuration space and perhaps send an acknowledgement packet back to the configuration agent 440 through switch core 420 that indicates the write was successful. In the case of a "read" configuration command, the packet will often identify the name of the parameter whose corresponding data is to be read as well as the specific configuration space from where the data is to be read. In this case, the agent that receives the packet will read the desired data and send an acknowledgement packet back to the configuration agent 440 through switch core 420.

Figure 5:
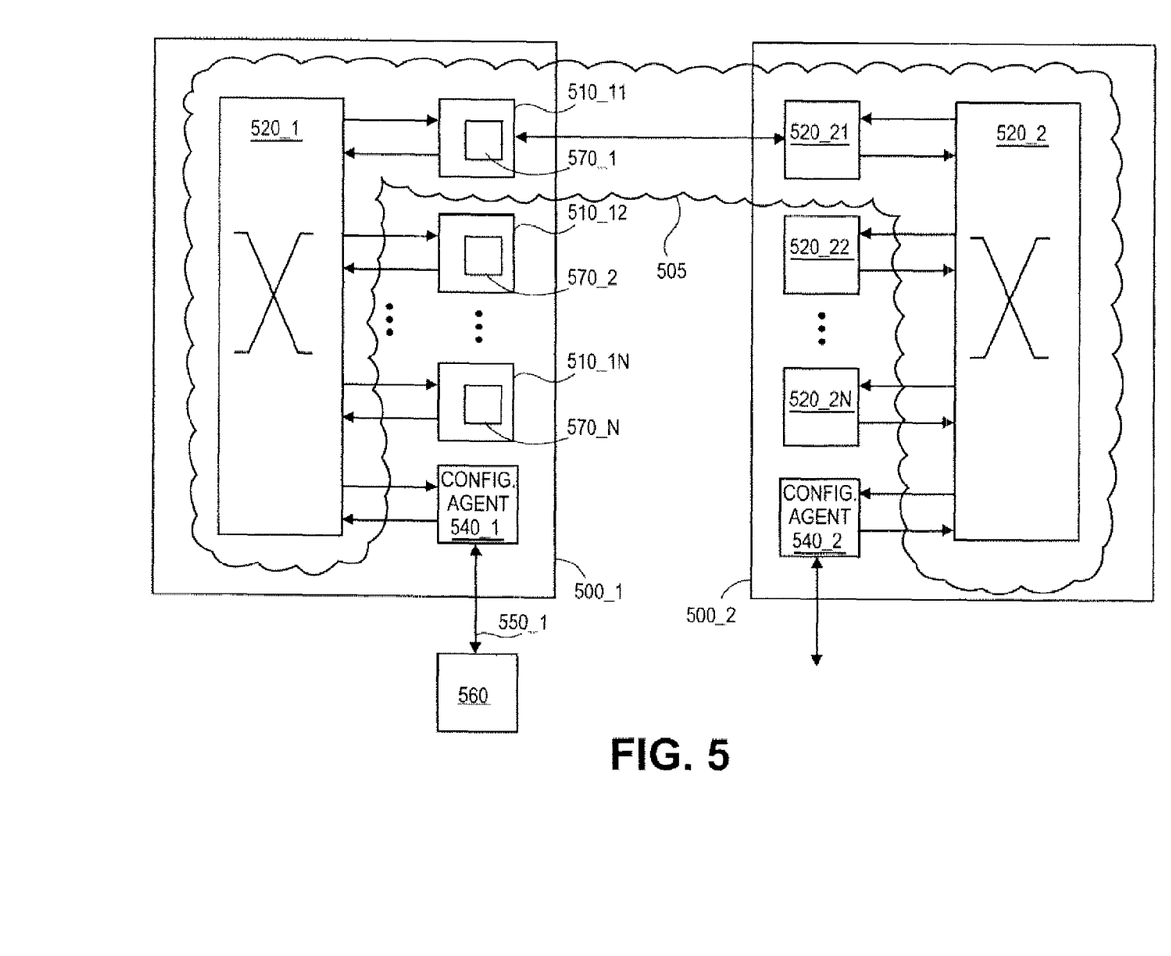
FIG. 5 shows a pair of chips having an "in-band" configuration design.

FIG. 5 shows an expanded computing system comprised of a pair of semiconductor chips 500_1, 500_2 designed as described just above. According to the depiction of FIG. 5, agents 510_11 and 510_21 have associated links that extend off their respective chips and are coupled to one another so as to effectively expand the computing system's network 505 across the pair of chips 500_1, 500_2. In implementation, the pair of semiconductor chips may communicate though on board "link agents" which essentially behave as a chip's respective Media Access Control (MAC) layer for a particular link. By expanding the computing system network as depicted in FIG. 5, the number of agents in the computing system is increased so as to increase the capabilities of the computing system. Note that, conceivably, the computing system's network can scale even further if the semiconductor chips 500_1, 500_2 have additional external bi-directional links coupled to switch cores 520_1, 520_2, respectively.

Figure 6:
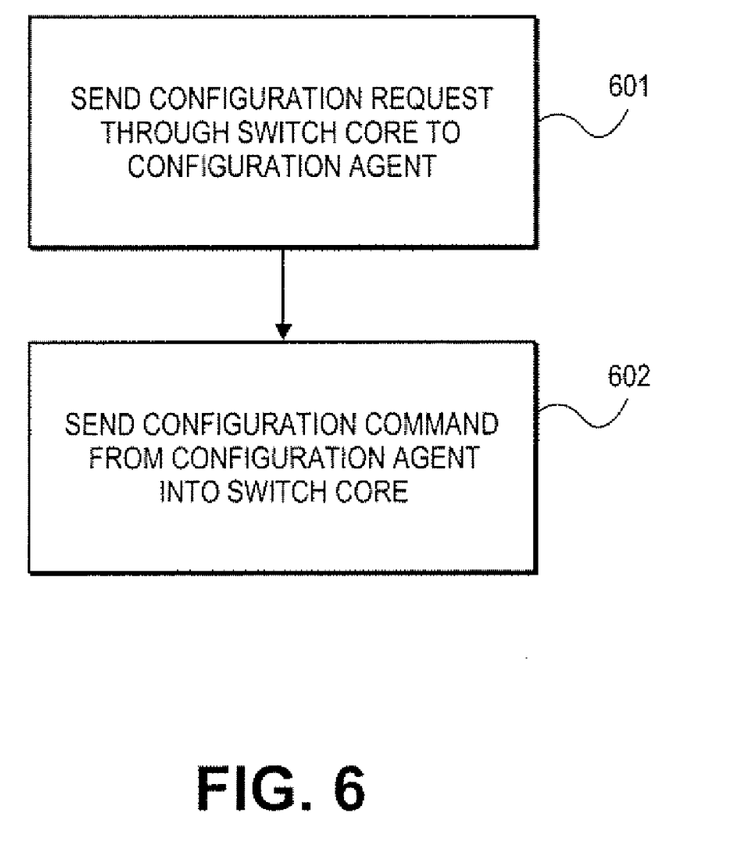
FIG. 6 shows configuration methodologies that can be performed with the semiconductor chip designs presented in FIGS. 4 and 5.

FIG. 6 shows a high level configuration methodology that can be executed with configuration agent 540_1. Note that certain, specific versions of the methodology of FIG. 6 carried out only on semiconductor chip 500_1 may also be applied to the circuit diagram of FIG. 4. However, because the high level methodologies of FIG. 6 can be applied to both single chip and multi-chip implementations, the discussion of FIG. 6 will be focused on the operation of configuration agent 540_1 for the sake of illustrative ease.

According to one approach, the configuration agent 540_1 is a focal point of configuration activity for its respective chip 500_1. Specifically, according to one embodiment, referring to FIGS. 5 and 6, any configuration request directed to a specific agent 510_11 through 510_1N on the configuration agent's 540_1 respective chip 500_1 is first sent 601 as a request ("the initial request") to the configuration agent 540_1. The configuration agent 540_1 processes the initial request and constructs a packet from it. The packet is then sent 602 from the configuration agent 540_1 into the switch core 504 which directs the packet toward the agent having the configuration space that is ultimately implicated by the initial request.

The initial request may or may not be written according to the same syntax that the configuration command is written according to. For instance, the initial request that is received by the configuration agent 540_1 may only specify a desired action and a target agent. In response, the configuration agent 540_1: 1) determines the network address of the target agent; 2) embeds the network address into the header of the packet; and, 3) translates the desired action into the identity of specific configuration space and a specific configuration command. In alternate implementations the initial request sent to the configuration agent may explicitly articulate the command and the configuration space in the proper syntax to effect an actual configuration command.

In operation the initial request may be generated on the configuration agent's 540_1 own semiconductor chip 500_1, or, external to the configuration agent's 540 own semiconductor chip 500_1. In the case of the initial request being generated on chip (e.g., by software running on a processing core associated with a system node to which one of agents 510_11 through 510_1N corresponds), the initial request is sent from the requesting agent (e.g., the system node of a processing core) through the switch core 520_1 to the configuration agent 540_1. The configuration agent 540_1 then formats the packet and sends it into the switch core 520_1 so that it can be directed to the appropriate target agent.

In the case of a write command the configuration agent 540_1 responds to the requesting agent by sending into the switch core 540_1 a packet directed to the requesting agent that contains an acknowledgement of success or failure. In the case of a read command, the packet sent back to the requesting agent from the configuration agent contains the data that was read. Note that in either case (read or write), the requesting agent must first received a response from the agent having the targeted configuration space that pertains to the command sent by the configuration agent before the configuration can respond to the requesting agent.

An external interface 450, 550_1 is provided so that initial requests can be sent to the configuration agent 540_1 from a source 560 that is external from the configuration agent's 540_1 own semiconductor chip 500_1. For instance, source 560 may correspond to a logic analyzer or computer used for testing and/or debugging the link based computing system of which semiconductor chip 500_1 is a part. In this case, interface 450, 550_1 may correspond to an industry standard off chip testing interface such as JTAG, I2C, SMBus, etc. or other type of communication channel that is not used for testing purposes. If the initial request is generated off chip and is provided to the configuration agent 540_1 through interface 550_1, the process is identical to that described above except that the initial request is received from interface 550_1 rather than switch core 520_1, and, moreover, the response to the initial request that is sent by the configuration agent 520_1 is sent through interface 550_1 rather than switch core 520_1.

In some instances a configuration attempt may invoke another semiconductor chip such as semiconductor chip 500_2. For instance, an external source of initial requests 560 may be attached to chip 500_1 but not chip 550_2, and, moreover, may desire to send a configuration command to a agent on chip 550_2. In this case, the initial request will be sent from source 560 to configuration agent 540_1. According to one implementation, configuration agent 540_1 simply behaves as the gateway to network 505 for source 560 and packetizes the initial request by simply wrapping a header around the initial request, where, the header includes as the destination address the configuration agent 540_2 of chip 500_1.

The packet is sent to the switch core 540_1 which sends it to chip 500_2. The switch core 540_2 of chip 500_2 forwards the packet to the chip's configuration agent 540_2. The configuration agent 540_2 constructs an appropriate configuration command and forwards it to the targeted agent through switch core 540_2. The configuration agent 540_2, upon completion of the command at the targeted agent on chip 500_2, sends a response to the source 560 into switch core 520_2 which in turn sends it to switch core 520_1. Switch core 520_1 then forwards the response to the configuration agent 540_1 of chip 500_1 which then forwards it to the source. In an alternate implementation, upon receipt of the initial request from source 560 by configuration agent 520_1, configuration agent 520_1 (rather than configuration agent 520_2) constructs the configuration command and sends it into the network 505 to configuration agent 520_2.

A similar process to that described just above which invokes both chips 500_1, 500_2 may also be effected wherein the source of the initial request is internal to a chip that does not contain the initial request's targeted agent. For instance, if agent 510_12 on chip 500_1 generated an initial request that targets an agent on chip 500_2, the initial request would be sent into switch core 520_1 which would forward it to configuration agent 540_1. Processes described just above may then executed with the exception that the response to the initial request is sent to agent 510_12 rather than source 560.

The multi-chip processes described just above embrace a design perspective where the configuration agents 540_1, 540_2 provide all configuration related communications between chips. In this case, the configuration agents 540_1, 540_2 should posses each other's network address. Moreover, a configuration agent that is first to receive an initial request (e.g., configuration agent 540_1) should be able to identify the correct network address for the "off-chip" network configuration agent to which the initial request is actually directed (e.g., configuration agent 540_2) based on, for example, the initial request's articulation of the targeted agent (e.g., agent 510_22) or some other information from which the location of the configuration command's execution can be determined (e.g., the identification of chip 500_2).

A pertinent issue surrounding "in-band" configuration processes is the configuration of the computing system's own internal network. Here, a kind of paradox is presented in which the configuration of the system depends on a working network, yet, the network itself requires configuration. Specifically, referring to FIG. 5, note the presence of address decoders and routing tables 570_1 through 570_N. Most transactions between the system's processing core(s) and memory controller(s) are for data or instructions at a specific memory address. In an implementation, an agent's address decoder is used to determine a network destination address from a specific memory address. For instance, a specific memory address is converted into the identity of specific home agent whose corresponding system memory keeps the data or instruction kept at that specific memory address.

In a same implementation, an agent's routing table determines, from an outgoing packet's destination address, a proper outbound channel (e.g., a link, a port) that emanates from the agent upon which the outgoing packet should be placed, and/or, a specific input port to a switch core upon which the outgoing packet should be placed. Here, note that multiple such output channel options may branch off from each one of agents 510_11 through 510_1N (e.g., to other agents and/or other portions of the network) but are not shown in FIG. 5 for illustrative simplicity a parameter that the switch core uses to direct the packet to the proper output port of the switch core. Thus, conversion of a specific targeted memory address into a specific outbound channel and/or switch input port is a two step process. First, conversion of the memory address into a specific network destination address with the address decoder; then, conversion of the destination address into a specific outbound channel and/or switch input with the routing table.

If the look-up tables used to implement the address decoders and routing tables of the various agents are not "filled out" —the network is not "fully configured". According to one approach, the bring-up of a system can be viewed as occurring in two phases: 1) an initial "firmware phase" in which the processing core agents of the system execute an initial set of instructions (akin to BIOS instructions) referred to as "firmware" that the processing core agents execute to perform basic tasks; and, 2) a "non firmware phase" in which non firmware are instructions are executed. Firmware instructions are typically stored in a non volatile read-only-memory (ROM) semiconductor device. Non firmware instructions are typically stored in a hard disk file and loaded into system memory and/or cache.

Figure 7:
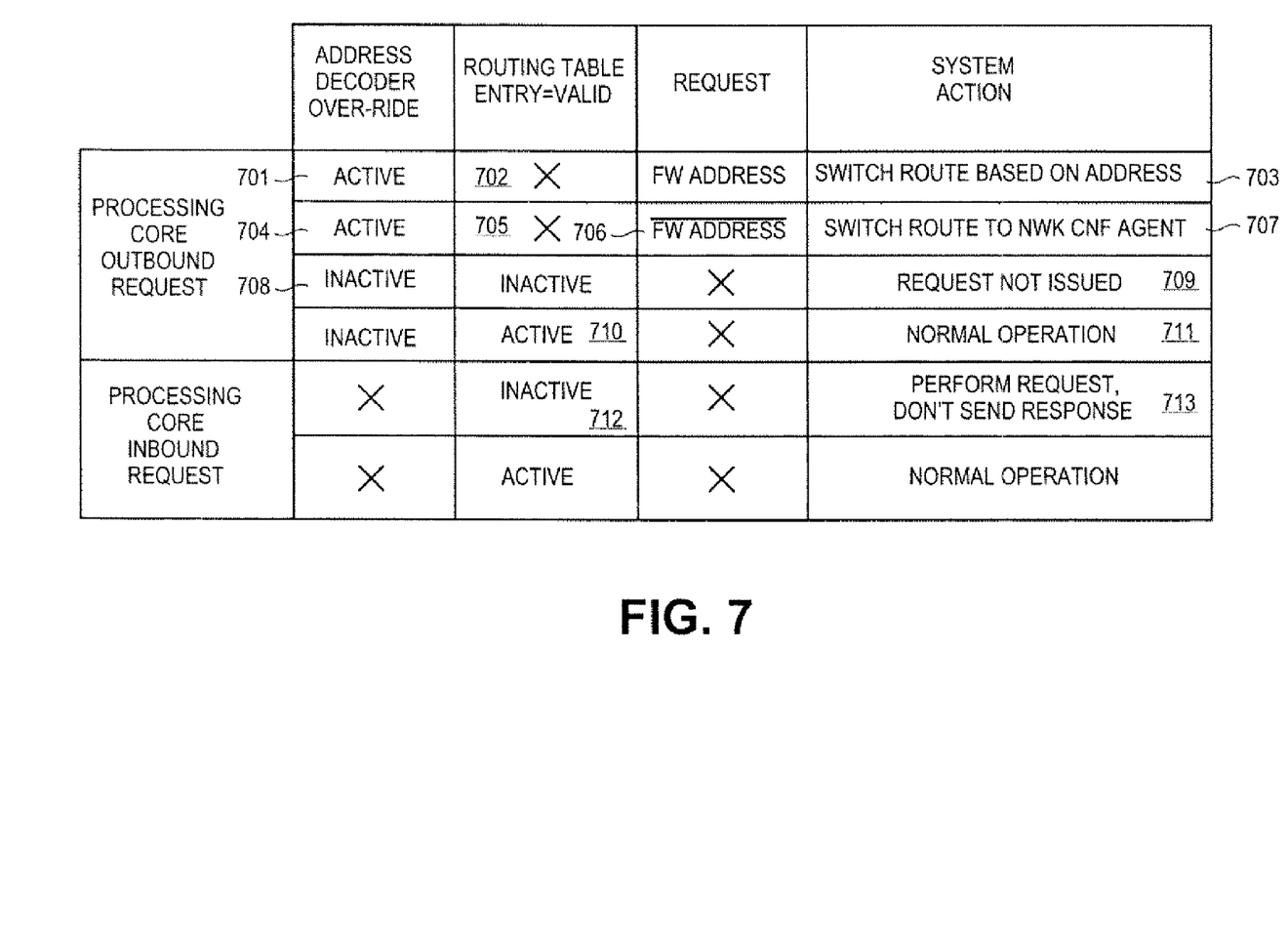
FIG. 7 shows a state table that describes the operation of a protocol engine that executes on a processing core.

If every processing core agent has its own local copy of firmware (e.g., each processing core agent has its own local ROM) then the network is not needed to bring-up the processing cores. However, in some instances the design point may be that single instances of firmware are kept local to a single processing core ("the parent"). These firmware instructions are then sent to one or more other processing cores ("the children") who request them on an address by address basis. Because the processing cores are at the level of executing firmware, the address decoders and routing tables are not expected to contain information sufficient to route the firmware requests and responses. FIG. 7 describes behavior for a child processing core that issues requests to another processing core agent for firmware instructions at a moment of time (the firmware phase) when the child processing core's address decoder and routing table are not yet configured.

Accordingly, a bit 701 is set (e.g., in a register) that indicates that the address decoder should be "over-ridden" (i.e., not used) because it is not configured. According to one approach, the bit is hard-coded to initially come out of a reset so as to be set to indicate an over-ride of the address decoder. Because the address decoder over-ride but is set 701, the routing table is simply ignored 702. Moreover, the switch core circuitry is "hard-wired" (i.e., designed) to route requests for firmware to the parent processing core and forward the requested firmware to the requesting child processing core 703. Processing cores may be configured to bring-up their own network configuration space in firmware, or, may have their network configuration space brought-up after the firmware phase.

If the later, the network configuration space (in this example, the address decoders and the routing tables of the various processing cores) is not configured yet firmware addresses are no longer in use. Therefore, the over-ride bit will still be set active 704 and the routing table ignored 705. A request sent into the switch core to configure the requesting agent's network configuration space or another agent's network configuration space will also, therefore, not correspond to a firmware address 706 (because the firmware phase has ended). According to the approach of FIG. 7, the switch core is hard-wired to route requests for non firmware addresses to the network configuration agent 707 (at least until the network's network configuration space is deemed sufficiently configured). Consistent with discussions above, the network configuration agent acts as a central source of competence for network configuration and essentially understands how to handle the request. If the request involves the configuration of another agent, again the switch core is hard-wired to route the command to the proper agent based on information provided by the network configuration agent.

There may be instances in mid stream of the configuration of a processing core's network configuration space where the address decoder is configured but the routing table entry is not 708 (e.g., because address decoders are configured before all routing table entries are configured) for an outbound request that does not pertain to network configuration space configuration (e.g., another type of transaction). In this case, according to FIG. 7, the processing core will not issue the request 709 and instead will wait for its routing table entry to become valid 710, which, essentially, corresponds to normal operation 711 (i.e., both the address decoder and routing table are used to process the outbound request). Not shown in FIG. 7 is the issuance of a request pertaining to network configuration space during condition 708. In this case, the request is sent to the network configuration agent who handles the request as discussed above.

If a processing core receives a request not related to network configuration space from a sending agent that it cannot identify because there exists no entry for the sending agent in the processing core's routing table 712, the processing core simply performs the request but cannot send a response 713. Not depicted in FIG. 7 is the handling of network configuration space requests (e.g., configuration commands) sent by the network configuration agent. These are executed with responses (e.g., acknowledgement or read data) sent to the network configuration agent.

It is pertinent to recognize that the present teachings are not limited to the specific semiconductor chip boundaries and/or contents described above. For instance, the architectural features of FIG. 5 could be disposed on a single semiconductor chip, and/or, the architectural features of FIG. 4 could be implemented with multiple semiconductor chips.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behaviorial level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing information in a form readable by a machine (e.g., a computer). For example, a machine readable medium includes read only memory (ROM); random access memory (RAM); magnetic disk storage media; optical storage media; flash memory devices; etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A semiconductor chip, comprising:
   a switch core;
   a processing core agent coupled to said switch core, said processing core agent to execute software of a link based computing system constructed from said semiconductor chip, said link based computing system having an architecture comprising a network that couples said processing core agent to a memory controller agent;
   a configuration agent coupled to said switch core, said switch core having an input port to receive a configuration packet sent by said configuration agent, said switch core to send said configuration packet toward another agent within said link based computing system, said semiconductor chip being designed such that said configuration agent has its own network address so that said configuration agent is capable of being a destination endpoint for a second configuration packet transported through said network, said configuration agent designed substantially with logic circuitry, said configuration agent to perform primarily configuration functions including comprehending and processing said second configuration packet's payload.

2. The semiconductor chip of claim 1 wherein said switch core is coupled to said memory controller agent.

3. The semiconductor chip of claim 1 comprising a plurality of processing core agents coupled to said switch core.

4. The semiconductor chip of claim 1 comprising an external communication interface to which equipment external to said semiconductor chip may attach, said interface communicatively coupled to said configuration agent.

5. The semiconductor chip of claim 4 wherein said external communication interface is selected from the group consisting of:
a) JTAG;
b) I2C;
c) SMBus.

6. A method, comprising:
directing a configuration request through a switch core to a configuration agent, said configuration request formatted according to a packet structure utilized by a network;
processing said configuration request at said configuration agent;
sending a configuration command derived from said configuration request from said configuration agent to said switch core; and,
executing said configuration command at an agent to which said configuration command pertains, said configuration command formatted according to a packet structure utilized by said network, wherein at least said directing, said processing and said sending are performed on a same semiconductor chip.

7. The method of claim 6 wherein said configuration command is a write.

8. The method of claim 6 wherein said configuration command is a read.

9. The method of claim 6 wherein said configuration command pertains to configuration of network configuration space.

10. The method of claim 7 comprising sending acknowledgement of a successful write from said agent through said switch core to said configuration agent.

11. The method of claim 8 comprising sending data read from said executing of said configuration command from said agent through said switch core to said configuration agent.

12. The method of claim 10 comprising sending a response to said request from said configuration agent to another agent that issued said request, said response indicating a successful write, said response sent through said switch core.

13. The method of claim 11 comprising sending a response to said request from said configuration agent to another agent that issued said request, said response containing said data, said response sent through said switch core.

14. The method of claim 10 comprising sending a response to said request from said configuration agent to testing equipment that issued said request, said response indicating a successful write, said response sent through a testing interface.

15. The method of claim 13 comprising sending a response to said request from said configuration agent to testing equipment that issued said request, said response containing said data, said response sent through a testing interface.

16. A link based computing system, comprising:
a switch core;
a processing core agent coupled to said switch core, said processing core agent to execute software of said link based computing system, said link based computing system comprising a network that couples said processing core agent to a memory controller agent, said network comprising point-to-point data links made of cables having a metallic signal propagation medium;
a configuration agent coupled to said switch core, said switch core having an input port to receive a configuration packet sent by said configuration agent, said switch core to send said configuration packet toward another agent within said link based computing system, said configuration agent having its own network address so that said configuration agent is capable of being a destination endpoint for a second configuration packet transported through said network, said configuration agent designed substantially with logic circuitry, said configuration agent to perform primarily configuration functions including comprehending and processing said second configuration packet's payload.

17. The link based computing system of claim 16 wherein said switch core is coupled to said memory controller agent.

18. The link based computing system of claim 16 comprising a plurality of processing core agents coupled to said switch core.

19. The link based computing system of claim 16 comprising an interface to which equipment external to said link based computing system may attach, said interface communicatively coupled to said configuration agent.

20. The link based computing system of claim 16 wherein said interface is an external communication channel interface.

* * * * *